United States Patent
Tran et al.

[11] Patent Number: 5,931,929
[45] Date of Patent: Aug. 3, 1999

[54] MODEM FOR CONNECTION TO A TELEPHONE LINE THROUGH A EITHER PORTABLE COMPUTER CONNECTOR OR A DOCKING STATION

[75] Inventors: Huyen B. Tran, Houston; Robin T. Castell, Spring, both of Tex.

[73] Assignee: Compaq Computer Corporation, Houston, Tex.

[21] Appl. No.: 08/775,593

[22] Filed: Dec. 31, 1996

[51] Int. Cl.⁶ .............................. G06F 13/14; G06F 9/02
[52] U.S. Cl. .............................. 710/69; 710/62; 710/70; 710/14; 710/101; 379/93.14; 341/22; 370/385; 375/222; 455/412
[58] Field of Search .............................. 395/821, 889, 395/890, 891, 892, 834, 884, 500, 882, 281; 375/222; 370/385, 349; 379/93.14; 361/686; 341/22, 26; 455/412; 439/639; 710/69, 70, 71, 72, 64, 62, 14, 101, 1

[56] References Cited

U.S. PATENT DOCUMENTS

| | | | |
|---|---|---|---|
| 5,411,416 | 5/1995 | Balon et al. | 439/639 |
| 5,526,493 | 6/1996 | Shu | 395/281 |
| 5,574,859 | 11/1996 | Yeh | 395/200.01 |
| 5,666,265 | 9/1997 | Lutz et al. | 361/683 |
| 5,668,977 | 9/1997 | Swanstrom et al. | 395/500 |
| 5,679,940 | 10/1997 | Templeton et al. | 235/380 |
| 5,701,515 | 12/1997 | Gradeler | 395/834 |
| 5,754,837 | 5/1998 | Walsh et al. | 395/555 |

*Primary Examiner*—Thomas C. Lee
*Assistant Examiner*—Rehana Perveen
*Attorney, Agent, or Firm*—Sharp, Comfort & Merrett, P.C.

[57] ABSTRACT

A laptop computer contains a built-in modem and has a phone jack for connection to a telephone line while the computer is being operated in a stand-alone mode. A docking station into which the laptop computer may be docked allows the combined unit to be operated in a desk-top mode. The docking station may have a full-sized keyboard and display so that the laptop functions as the main computer a user may employ in the office or home. A telephone connection is already in place at the docking station so that the user need not make a phone line connection to invoke the docked mode, but instead merely nests the laptop in the docking station. In one embodiment, the only components of the modem that are duplicated in the docking station are the phone jack itself and an isolation and 2-to-4 wire converter, so the plug-in connector ordinarily employed between a laptop and a docking station may be of a low-voltage, spike voltage protected form, whereby the coupling used for computer logic and control levels is compatible. The possibility of damage to computer circuits due to the proximity of high-voltage telephone line connections is thus avoided.

23 Claims, 4 Drawing Sheets

MODEM FOR CONNECTION TO A TELEPHONE LINE THROUGH A EITHER PORTABLE COMPUTER CONNECTOR OR A DOCKING STATION

BACKGROUND OF THE INVENTION

This invention relates to modem connections for portable computers, and more particularly to a portable computer having a built-in modem and facility for using a telephone connection in a docking station for the portable computer.

Portable computers of the laptop or notebook size usually have modem devices so that telephone transmission is available for email or facsimile functions. This facility is a primary forte of a portable computer as it is often used by persons who travel and must make connections to a home office. Usually, a modem card is employed of the PCMCIA type, i.e., a separate plug-in card or circuit board. When the portable computer is operated in a stand-alone mode, the modem card is connected to a telephone line using a standard RJ-11 connector. An example of a modem configuration for a portable computer is disclosed in my U.S. Pat. No. 5,428,671, assigned to Compaq Computer Corporation, assignee of this invention.

Many portable computers have a corresponding docking station so that the computer may be operated in a permanent setting such as an office or home, in the manner of a desk-top computer. The docking station usually has a power supply arrangement so that the portable computer need not operate on battery power when docked, and often has a full-sized keyboard and display associated with it. Connections may be made to a network, via an ethernet card or the like, and various peripheral such as additional disk drives, a printer, etc., may be located at the desktop site, connected to the docking station.

An advantageous construction of a portable computer with a docking station would allow all of the peripherals located at the docking station to be semi-permanently in place, so the coupling of the portable with the docking station is accomplished with a minimum of manual steps. That is, the fewer plug-in connections to be made when berthing the laptop into the docking station, the better. For peripherals such as the keyboard and monitor, this is easily accomplished because the components are merely duplicated. The LCD display used in the laptop is replaced by a full-sized CRT type monitor, and the small keyboard and touchpad or trackball devices built into the laptop are replaced by a full-sized keyboard and mouse or trackball.

Previously it has been the practice to utilize the phone jack on the modem card of the portable computer itself to establish a phone line connection, even when the portable computer is berthed in the docking station. While this is efficient and reliable, the requirement for performing a separate plug-in operation for the phone cord, as well as the clutter added to a desk-top environment by an additional cord, leave this solution to be less than optimum. Preferably, the user should be able to make a single-step connection and not unduly add to the jumble of cords usually associated with desktop computer equipment.

It would be a simple task to route a phone line connection from a phone jack on the docking station to the plug-in connection between the laptop and the docking station, so that a phone line could remain in place for the docking station and thus for the laptop when it was berthed. However, the phone line is a high voltage line, compared to the internal conductors of a portable computer, and so the phone line is not compatible with the other internal wiring. Thus, the phone connection cannot be routed with the other connections which are made between the laptop and the docking station.

SUMMARY OF THE INVENTION

It is therefore one object of the present invention to provide an improved telephone connection via a modem in a portable (laptop) computer which has a docking station.

It is another object of the present invention to provide an improved construction of portable computers with docking stations in which a permanent telephone line connection is in place at the docking station.

It is a further object of the present invention to provide a method of making a telephone line connection in a portable computer which has a docking station, in a way which avoids high-voltage coupling within the laptop or docking station.

The above as well as additional objects, features, and advantages of the present invention will become apparent in the following detailed written description.

According to one embodiment of the invention, a laptop computer contains a built-in modem which has a phone jack for connection to a telephone line while the computer is being operated in a stand-alone mode. A docking station is provided into which the laptop computer may be docked when it is being operated in a desk-top mode. The docking station may have a full-sized keyboard and display so that the laptop functions as the main computer a user may employ in the office or home. A telephone connection is already in place at the docking station so that the user need not make wiring connection to invoke the docked mode, but instead merely nests the laptop in the docking station. In one embodiment, the only components of the modem that are duplicated in the docking station are the phone jack itself and an isolation and 2-to-4 wire converter, so the plug-in connector ordinarily employed between a laptop and a docking station may be of a low-voltage, spike voltage protected form so that the coupling ordinarily used for computer logic and control levels is compatible. The possibility of damage to computer circuits due to the proximity of high-voltage telephone line connections is thus avoided.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the to following detailed description of an illustrative embodiment when read in conjunction with the accompanying drawings, wherein:

DETAILED DESCRIPTION OF PREFERRED EMBODIMENT

Figure 1:
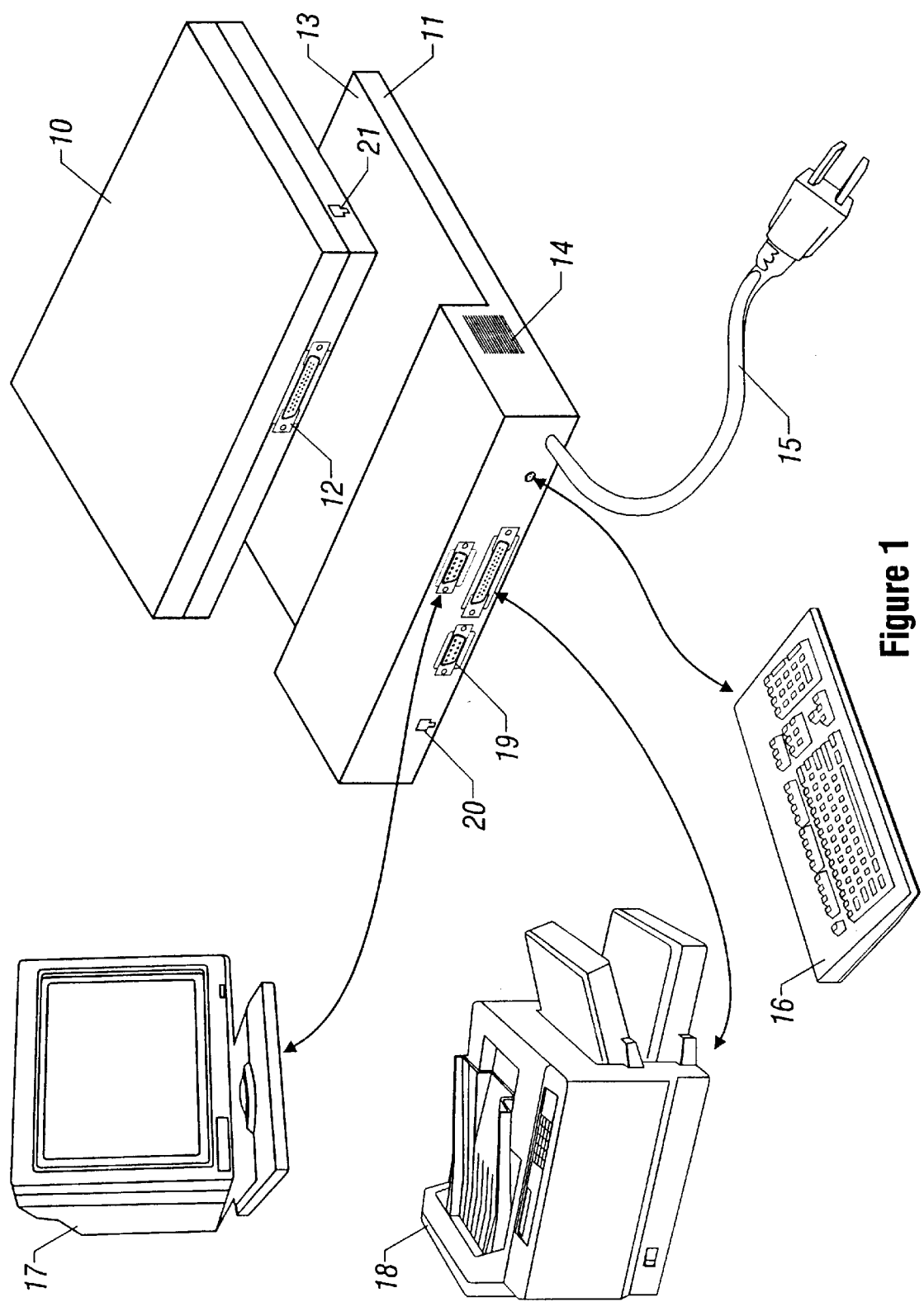
FIG. 1 is a pictorial view of a laptop computer and its docking station, in which an internal modem and telephone line connection may be implemented according to an embodiment of the invention.

Referring to FIG. 1, a notebook or laptop computer 10 is shown along with a docking station 11. The laptop computer 10, in the usual manner, has a keyboard and an LCD-type display in a folding configuration. The laptop 10 is operated in a stand-alone mode with an internal rechargeable battery or with a adapter/battery charger cord connected to AC line. Or, the laptop 10 is configured to be readily plugged into the docking station 11 by a single multiconnector plug 12 so that a desk-top computing station is provided. The docking station 11 includes a recess 13 to receive the laptop computer 10, and a plug-in electrical receptacle for mating with the corresponding connector 12 on the back edge of the laptop computer 10. The laptop computer 10 is battery-operated while apart from the docking station 11, and is powered from the docking station 11 when docked. The docking station 11 has speakers 14 on each side, a cord 15 for AC power, a full-sized keyboard 16, a full-sized monitor 17, a connection to a printer 18, as well as connections such as plug 19 for networks or the like. A mouse or trackball may also be permanently connected to the docking station, as well as other accessories such as microphone, joy-stick, etc. Additional memory resources, including disk drives, a CD-ROM drive, and/or a tape back up, may be included in the docking station, accessed by the laptop 10 when it is berthed in the docking station.

According to a feature of the invention, the docking station 11 has a telephone connector 20 of the usual RJ-11 type so that the docking station 11 can have a telephone line in place all the time, connected to the telephone jack of the office or home where the docking station 11 is located. That is, the user need not make a telephone cord connection at the time the laptop computer 10 is plugged in. Instead, only one connection need be made, that of engaging the connector 12 with the mating connector of the docking station 11. The laptop computer 10 has its own separate telephone jack 21 which is used to plug in a telephone cord when the laptop computer 10 is being operated separate from the docking station 11. Note that the modem employed in the laptop computer 10 is a built-in modem, located on a daughter-board within the housing of the laptop, rather than being a PCMCIA card as is the usual practice. The advantage of a built-in modem is that it is less costly and more reliable; if most laptop computers being manufactured are going to have modems installed anyway, then it is much more cost-effective and reliable to install the components of the modem on the motherboard or a daughter board, rather than incurring the parts and manufacturing expense of a connector to a PCMCIA modem card and the card itself. It would be undesirable, however, to duplicate all of the modem components in the docking station in order to provide the permanent connection to the telephone jack 20. The major problem with routing the telephone connections, however, is that the telephone line is a high voltage line, up to 50 V, with the possibility of transients of much higher than that, whereas the connections within the laptop computer 10 and the docking station 11 are at computer operating voltages, e.g., 3 V to 12 V DC. Some computers are now being manufactured which use only 3.3 V DC internally.

Figure 2:
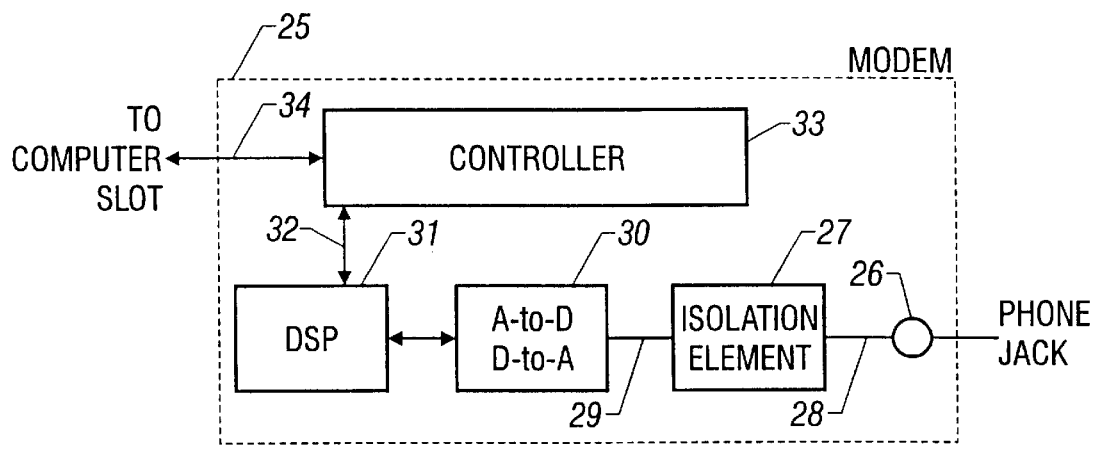
FIG. 2 is an electrical diagram of a modem board according to the prior art.

Referring now to FIG. 2, a typical modem module or board 25 contains a phone jack 26 of the RJ-11 type, like the phone jacks 20 and 21 of FIG. 1. This phone jack 26 is connected to a telephone line cord, in ordinary use. The telephone line contains two wires called tip and ring, and these two wires carry the incoming and outgoing analog telephone signals, the ring signal, and the power which operates the telephone set itself in some traditional phone installations. The voltages occurring on the telephone line are ordinarily up to 50 V, with the possibility of surges or spikes of much higher in the case of lighting or other events. Thus, the telephone line or telephone jack 26 must be isolated from components within the computer to prevent damage to the integrated circuits and other elements used in the computer system. An isolation element and 2-wire to 4-wire converter 27 is used to change the high-voltage two-wire coupling 28 to a low-voltage, surge-protected four-wire link 29 suitable for internal routing with a laptop computer housing. The isolation element 27 may employ voltage clamping devices such as used for over-voltage and/or ESD protection in integrated circuit devices, as well as a transformer to provide the isolation and to change the analog voltage level. In a preferred embodiment, optical couplers are used to couple the send and receive signals to the remainder of the modem circuit, although transformers could be used also. The DC power supplied by an ordinary telephone line is not needed by the modem 25, so just the analog audio signals and the ring signals are allowed to pass through the isolating element 27 to the internal computer circuits. An analog-to-digital and digital-to-analog converter 30 changes the analog signal from the telephone line to a digital representation for use in the computer circuits. A digital signal processor 31 of the type commercially available is used for the filtering functions, decoding and encoding data, signal detection, etc., as is the usual practice, providing digital data to and receiving digital data from the computer system bus or I/O bus via lines 32, modem controller 33, and bus 34. FIG. 2 illustrates the components of a typical modem, whether of the PCMCIA type for a laptop, or a modem card in a desktop computer, or an integrated modem on a motherboard.

Figure 3:
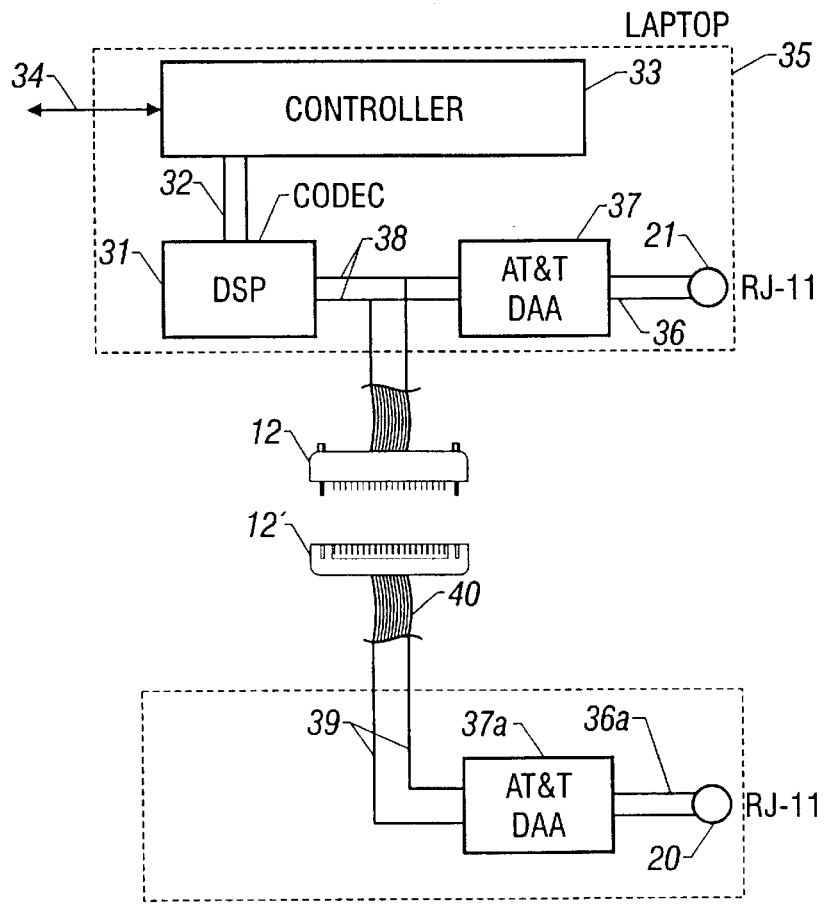
FIG. 3 is an electrical diagram of a modem to telephone line connection for the laptop computer and docking station of FIG. 1, constructed according to one embodiment of the invention.

Referring to FIG. 3, a modem configuration is illustrated according to one embodiment of the invention. A modem board 35 within the housing of the laptop 10 has the RJ-11 telephone jack 21 as in FIG. 1, providing the tip and ring lines 36 as before. The two-line tip and ring 36 connection is coupled to a combination isolation and 2-to-4 wire converter 37 which in this example is a part that is commercially available from the Luccent Technology division of the AT&T Corp. as a part number "ATTD256B" referred to as a Direct Access device. The device 37 is designed for the purpose of use in a modem board or similar telephone access circuit for a computer or the like, and is relatively inexpensive, so it may be duplicated in the docking station 11 at a cost that is not prohibitive. The device 37 is shown directly connected via lines 38 to a digital signal processor 31 as before, and in this case it may be noted that a codex or A-to-D and D-to-A conversion may be performed within the digital signal processor 31 itself, rather than having a separate A-to-D and D-to-A converter 30 as illustrated in FIG. 2. The digital data to and from the signal processor 31 is coupled to the computer I/O bus via a modem controller 33 and lines 32 and 34 as above. Thus, when the laptop 10 is operated in its standalone mode, away from the docking station, the telephone connection is configured and operates essentially in a conventional manner. However, when nested in the docking station 11, the modem operation is different; the phone jack 20 of the docking station is employed rather than the phone jack 21 of the laptop 10. Another isolation and 2-to-4 wire converter 37a just like the device 37 is permanently installed within the docking station 11, and a connection is made through the connector plug 12 to the lines 38 of the modem board 35 of the laptop 10, via lines 39. The lines 39 are included within a flat multi-line connector cable 40 going to a connector 12' on the docking station 11 which mates with the connector 12 of the laptop computer 10; the cable 40 is a low-voltage cable containing all of the logic-level voltages and supply voltages at low level as used for all of the other computer functions, i.e., for transferring data and controls. For example, the lines 38 and 39 are 3 V lines rather than being high voltage lines as used for the telephone line connections 36 or 36a.

There are tradeoffs and compromises in making the connection between modem circuits at the location illustrated in FIG. 3, rather than at some other location. In the configuration of FIG. 3, only two components, the phone jack 20 and the isolation/converter device 37 need to be duplicated. If the phone jack wasn't duplicated, then the advantage of having a telephone connection in place all the time at the docking station couldn't be achieved. If the isolation/converter device 37 was not duplicated, i.e., the interconnection was made at the lines 36 to 36a, then the voltage levels of the wiring within the laptop to and from the connector 12, and in the connector 12-12' itself, would not be compatible with computer board voltages, and so a separate phone connection would be needed, i.e., another separate plug-in connector between the laptop 10 and the docking station 11. Such a configuration would have certain advantages, however, in that the cost of components would probably be lower (though the mechanical construction may be more costly), and the cost and delay of getting underwriters and regulatory agency approval in various countries where the laptops and docking stations are to be sold may be lower since a simple mechanical-type coupling just like a phone connection is made through the internal construction of the docking station, rather than an electronic conversion as described with reference to FIG. 3. Also, such a construction would have relatively low noise introduced in the phone connection because it is mostly a mechanical coupling.

Figure 4:
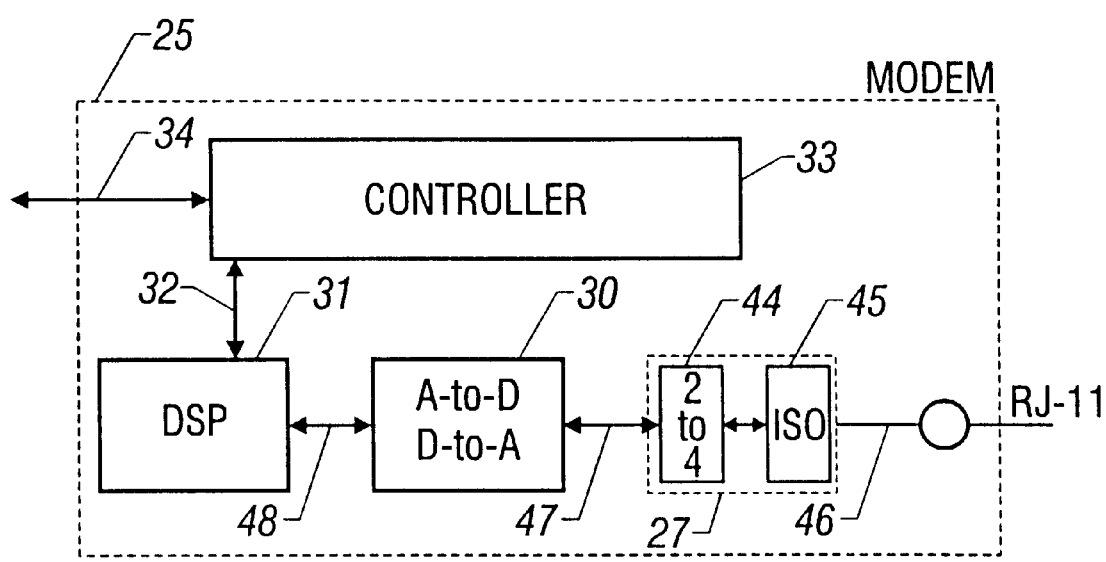
FIG. 4 is a diagram like FIGS. 2 and 3, illustrating various alternatives for making the modem to telephone line connection of the invention.

Referring to FIG. 4, a modem board 25 for a laptop 10 is again shown as in FIG. 2, with the alternatives for connecting a phone to a docking station 11 illustrated. Here the isolation and 2-to-4 wire conversion device 27 or 37 is shown as separate elements 44 and 45. Note that the position of elements 44 and 45 may be exchanged, i.e., the 2-o-4 wire conversion could be outboard of the isolation function. In any event, due to the availability of the low cost combined AT&T DAA device 37, it is preferable to combine the two in one unit. As described in the previous paragraph, an alternative is to make the connection at point 46, between the phone jack 21 and the phone jack 20, i.e., at lines 36–36' of FIG. 3; this alternative has the advantages as set forth above. The alternative of FIG. 3, i.e., connection at point 47 of FIG. 4, may be a preferred embodiment in that the cost is relatively low and the combined AT&T DAA unit and a combined codex and digital signal processor can be used, as well as a single connector 12 at low voltage. Connection could also be made at point 48, i.e., duplicating the A-to-D and D-to-A conversion 30 in the laptop computer 10 and docking station 11; this would have an advantage in low noise because the signals on the coupling through the connector 12 would be digital rather than analog and so would be less susceptible to noise. This latter construction would be more costly, since the codex must be duplicated, and of course does not allow the alternative of using the digital signal processor 31 for the codex function.

Figure 5:
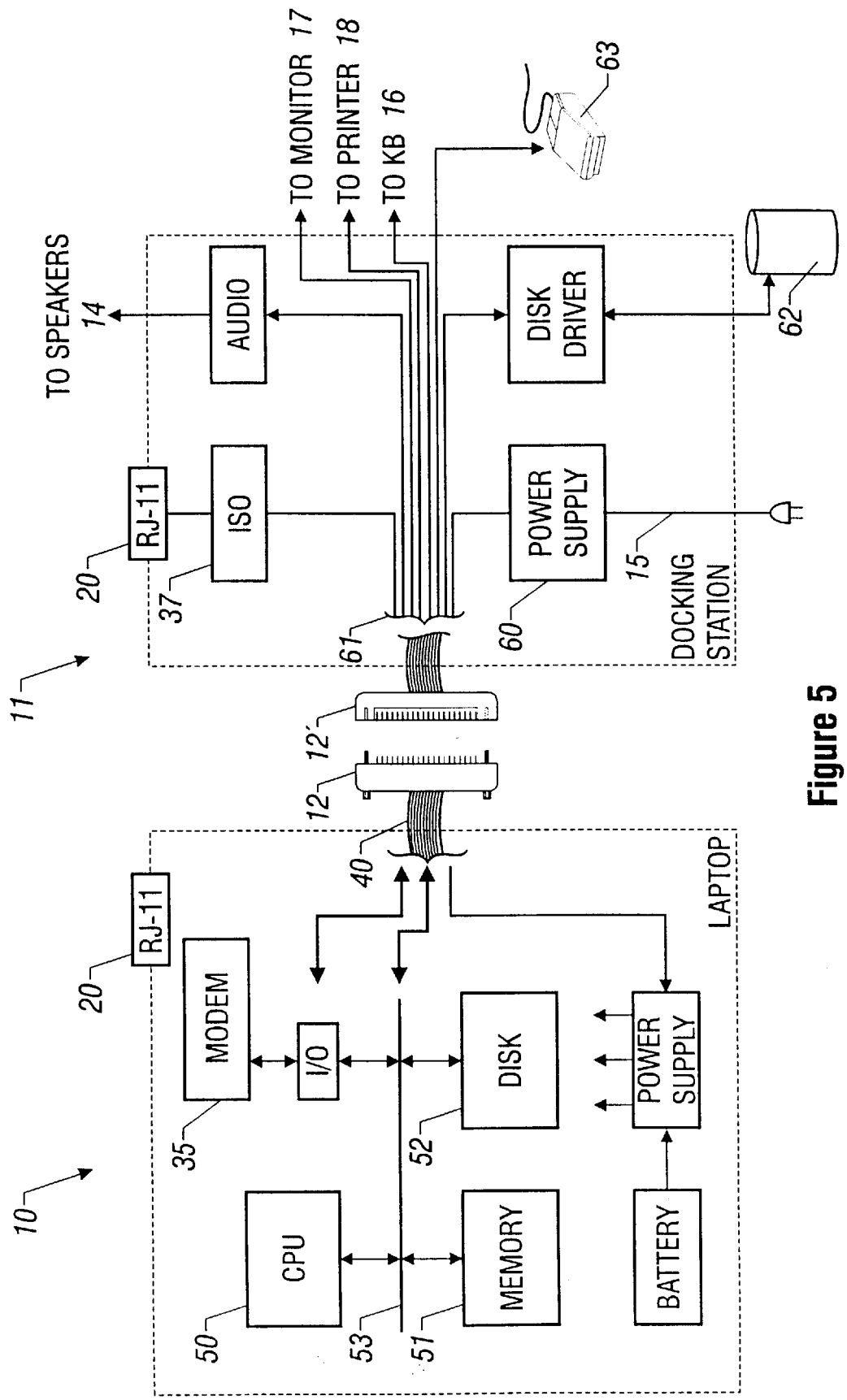
FIG. 5 is an electrical diagram showing the system of FIG. 1 using the modem connection of FIG. 3.

Referring now to FIG. 5, the computer system including the laptop 10 and the docking station 11 is shown. The laptop has a CPU 50 connected to main memory 51 and a disk storage unit 52 by system bus 53. The laptop is powered by a battery 54 and a power supply circuit 55. The battery 54 may be charged by an adapter/charger 56 connected to an AC line 57. The modem 35 is also accessed by the CPU via the system bus 53 and an I/O bus. Connection to the elements of the docking station 11 is by the multiconductor plug-in connector 12 which conveys both logic voltages and power supply voltages to and from the docking station. Within the docking station 11 is a power supply for which the AC power line stays in place, so when the laptop is berthed, the adapter/charger 56 is not needed. Connections 61 from the plug-in 12' to the speakers 14, the keyboard 16, the monitor 17, the printer 18, and other devices such as a disk drive 62 and mouse 63 are internally wired.

While the invention has been particularly shown and described with reference to a preferred embodiment, it will be understood by those skilled in the art that various changes in form and detail may be made therein without departing from the spirit and scope of the invention.

What is claimed is:

1. A computer system comprising:
    a portable computer having a housing;
    a docking station for receiving said portable computer, the docking station including electrical connecting paths making connection between said portable computer and said docking station;
    a modem in said portable computer, the modem including signal processing circuits and including a first phone jack for making direct connection to a telephone line, with coupling between said first phone jack and said signal processing circuits, wherein said coupling includes a first isolation unit for coupling said first phone jack to said signal processing circuits to isolate high voltages appearing on said telephone line and first phone jack from said signal processing circuits;
    a phone line connection in said docking station including a second phone jack;
    a second isolation unit in said docking station; and
    said connecting paths coupling said second phone jack of said docking station to said signal processing circuits in said portable computer via said coupling.

2. A computer system according to claim 1 wherein each of said first and second isolation units include a conversion unit for converting the format of a telephone line to signals usable in said signal processing circuits, and wherein said signal processing circuits include an A-to-D and D-to-A conversion function.

3. A computer system according to claim 1 wherein said signal processing circuits operate at voltages less than about 12 V and said high voltages are standard phone line voltages of up to about 50 V.

4. A computer system according to claim 1 including a phone line connection remaining in place to said second phone jack, and a temporary phone line connection to said first phone jack which is in place only when needed by a user during times said portable computer is not berthed in said docking station.

5. A method of operating a computer system of the type having a portable unit and a docking station, comprising the steps of:
    connecting said portable unit to a telephone line for data communications via a first telephone jack on said portable unit only when said portable unit is not berthed in said docking station;
    berthing said portable unit in said docking station and connecting said portable unit to a telephone line for data communications via an electrical receptacle between said portable unit and said docking station, using a second telephone jack in said docking station and low voltage paths through said electrical receptacle; and isolating signal processing circuits within said portable unit from said first and second phone jacks by separate first and second isolation units, the first isolation unit being located within said portable unit and the second isolation unit being located within said docking station.

6. A method of operating a computer system according to claim 5 including the step of converting the format of said telephone line to a format for said signal processing circuits by use of first and second conversion devices located in said portable unit and said docking station, respectively.

7. A method of operating a computer system according to claim 5 wherein said signal processing circuits use low voltages of not more than about 12 V and said telephone line uses high voltages of up to about 50 V.

8. A method of operating a computer system according to claim 5 including keeping a phone line connection in place to said second phone jack even when said portable unit is not berthed in said docking station, and making a temporary phone line connection to said first phone jack only when needed by a user when said portable unit is not berthed in said docking station.

9. A portable computer comprising:

a housing, with a manual input and a visual display;

electrical connecting paths for making connections between said portable computer and a separate docking station for receiving said portable computer;

a modem in said portable computer, the modem including signal processing circuits operating at low voltages and including a first phone jack for making direct connection to a telephone line, and coupling between said phone jack and said signal processing circuits, wherein said coupling includes an isolation unit for coupling said phone jack to said signal processing circuits to isolate high voltages appearing on said telephone line and phone jack from said signal processing circuits; and a phone signal connecting path through said electrical connections for making connection from said coupling for an in-place phone line connection in said docking station.

10. A portable computer according to claim 9 in combination with a docking station, said docking station including a second phone jack for said in-place phone line connection.

11. A portable system according to claim 10 including a phone line connection remaining in place to said second phone jack, and a temporary phone line connection to said first phone jack which is in place only when needed by a user during times said portable computer is not berthed in said docking station.

12. A modem for a portable computer comprising:

signal processing circuits operating at low voltages;

a phone jack for making direct connection to a telephone line when said portable computer is operated in a stand-alone mode, the phone jack conveying higher voltages;

a coupling between said phone jack and said signal processing circuits wherein said coupling includes an isolation unit for coupling said phone jack to said signal processing circuits to isolate said higher voltages appearing on said telephone line and phone jack from said signal processing circuits; and a phone signal connecting path for making connection from said coupling to an in-place phone line connection in a docking station separate from said modem.

13. A modem according to claim 12 in combination with a portable computer containing said modem and docking station, said docking station including a second phone jack for said in-place phone line connection.

14. A modem according to claim 13 including a phone line connection remaining in place to said second phone jack, and a temporary phone line connection to said first phone jack which is in place only when needed by a user during times said portable computer is not berthed in said docking station.

15. A docking station for a computer system comprising:

a receiving area of said docking station for receiving a portable computer, the docking station including electrical connecting paths making connections between said docking station and the portable computer;

an in-place phone line connection in said docking station including a phone jack and a coupling for connection of phone signal information to signal processing wherein said coupling includes an isolation unit for coupling said phone jack to said signal processing to isolate higher voltages appearing on said telephone line and phone jack from lower voltage circuits of said signal processing; and said connecting paths connecting said coupling of said docking station to signal processing in the portable computer.

16. A docking station according to claim 15 in combination with a portable computer containing a modem, said modem including another phone jack for a temporary phone line connection when the portable computer is not berthed in said receiving area.

17. A docking station according to claim 16 including a phone line connection remaining in place to said first phone jack, and a temporary phone line connection to said another phone jack which is in place only when needed by a user during times said portable computer is not berthed in said receiving area of said docking station.

18. A method of operating a computer system of the type having a portable unit and a docking station, comprising the steps of:

connecting said portable unit to a telephone line for data communications via a first telephone jack on said portable unit only when said portable unit is not berthed in said docking station;

berthing said portable unit in said docking station and connecting said portable unit to a telephone line for data communications via an electrical receptacle between said portable unit and said docking station, using a second telephone jack in said docking station and low voltage paths through said electrical receptacle;

converting the format of said telephone line to a format for said signal processing circuits by use of first and second conversion devices located in said portable unit and said docking station, respectively.

19. A portable computer in combination with a docking station, the portable computer comprising:

a CPU;

a memory coupled for access by the CPU;

a disk drive coupled for access by the CPU;

a modem coupled for access by the CPU, the modem including a signal processing circuit and an isolation circuit coupled to the signal processing circuit;

a docking connector coupled to a node between the signal processing circuit and the isolation circuit; and a phone jack with an input coupled to an output of the isolation circuit;

and the docking station including:

a connector mateable with the docking connector of the portable computer;

a second phone jack coupled to the connector of the docking station; and a second isolation circuit coupled between the second phone jack and the connector of the docking station.

20. The computer of claim 19 wherein the modem further comprises an analog-to-digital converter circuit, the converter circuit coupled between the isolation circuit and the docking connector.

21. The computer of claim 19 wherein the phone jack comprises an RJ-11 connector.

22. The computer of claim 19 wherein the isolation circuit includes a conversion circuit to convert the format of a telephone line to signals usable in the signal processing circuit.

23. The computer of claim 19 wherein the signal processing circuit includes an analog-to-digital converter and a digital-to-analog converter.

* * * * *